(12) United States Patent
Kuribayashi (10) Patent No.: US 11,570,362 B2
(45) Date of Patent: *Jan. 31, 2023

(54) IMAGE CAPTURING DEVICE, IMAGE CAPTURING METHOD, AND PROGRAM

(71) Applicant: FUJIFILM Corporation, Tokyo (JP)

(72) Inventor: Kosuke Kuribayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,796

(22) Filed: Mar. 16, 2022

(65) Prior Publication Data

US 2022/0210330 A1 Jun. 30, 2022

Related U.S. Application Data

(63) Continuation of application No. 17/115,905, filed on Dec. 9, 2020, now Pat. No. 11,310,424, which is a continuation of application No. PCT/JP2019/027302, filed on Jul. 10, 2019.

(30) Foreign Application Priority Data

Aug. 30, 2018 (JP) .............................. JP2018-161651

(51) Int. Cl.
*H04N 5/232* (2006.01)
*H04N 5/225* (2006.01)
(Continued)

(52) U.S. Cl.
CPC ....... *H04N 5/23267* (2013.01); *H04N 5/2254* (2013.01); *H04N 5/23258* (2013.01)

(58) Field of Classification Search
CPC ............. H04N 5/23267; H04N 5/2254; H04N 5/23258
See application file for complete search history.

(56) References Cited

U.S. PATENT DOCUMENTS

| | | | |
|---|---|---|---|
| 11,310,424 B2 * | 4/2022 | Kuribayashi | .......... G03B 17/14 |
| 2005/0140793 A1 | 6/2005 | Kojima et al. | |

(Continued)

FOREIGN PATENT DOCUMENTS

| | | |
|---|---|---|
| CN | 104580880 A | 4/2015 |
| CN | 104683687 A | 6/2015 |

(Continued)

OTHER PUBLICATIONS

International Search Report issued in PCT/JP2019/027302; dated Oct. 15, 2019.

(Continued)

*Primary Examiner* — Christopher K Peterson
(74) *Attorney, Agent, or Firm* — Studebaker & Brackett PC (57) ABSTRACT

An image capturing device includes an imaging lens, an image capturing device body including an imaging element that captures an optical image transmitting through the imaging lens, a first correction unit that performs correction of an image shake by a correction lens, and a second correction unit that performs correction of the image shake by the image capturing device body, and performs a control of causing the first correction unit or the second correction unit to correct a first frequency portion of a shake amount of the image shake having a first frequency and causing the first correction unit and the second correction unit to share and correct a second frequency portion of the shake amount of the image shake having a second frequency higher than the first frequency.

20 Claims, 8 Drawing Sheets

(51) Int. Cl.
*G03B 5/00* (2021.01)
*G03B 17/14* (2021.01)

(56) References Cited

U.S. PATENT DOCUMENTS

| | | |
|---|---|---|
| 2007/0065129 A1 | 3/2007 | Shiratori |
| 2015/0103194 A1 | 4/2015 | Takeuchi |
| 2015/0146024 A1 | 5/2015 | Takeuchi |
| 2015/0172548 A1 | 6/2015 | Takeuchi |
| 2016/0134814 A1 | 5/2016 | Yoneyama |
| 2016/0261806 A1* | 9/2016 | Honjo ............... H04N 5/23209 |
| 2017/0353667 A1* | 12/2017 | Miyahara ........... H04N 5/23267 |
| 2019/0199930 A1* | 6/2019 | Noguchi ............ H04N 5/23258 |

FOREIGN PATENT DOCUMENTS

| | | |
|---|---|---|
| CN | 104717403 A | 6/2015 |
| JP | 2005-189654 A | 7/2005 |
| JP | 2007-010895 A | 1/2007 |
| JP | 2010-091792 A | 4/2010 |
| JP | 2012-178712 A | 9/2012 |
| JP | 2015-105975 A | 6/2015 |
| JP | 2015-135387 A | 7/2015 |
| JP | 2016-090973 A | 5/2016 |
| JP | 2017-161891 A | 9/2017 |
| JP | 2017-219635 A | 12/2017 |

OTHER PUBLICATIONS

International Preliminary Report on Patentability issued in PCT/JP2019/027302; completed Mar. 30, 2020.
An Office Action mailed by China National Intellectual Property Administration dated Sep. 2, 2021, which corresponds to Chinese Patent Application No. 201980055437 and is related to U.S. Appl. No. 17/115,905; with English language translation.
An Office Action; "Notice of Reasons for Refusal", mailed by the Japanese Patent Office dated Feb. 8, 2022, which corresponds to Japanese Patent Application No. 2021-070971 and is related to U.S. Appl. No. 17/115,905; with English language translation.

* cited by examiner

FIG. 11

IMAGE CAPTURING DEVICE, IMAGE CAPTURING METHOD, AND PROGRAM

CROSS-REFERENCE TO RELATED APPLICATIONS

This application is a Continuation of US application No. U.S. Ser. No. 17/115,905 filed on Dec. 9, 2020, which claims priority under 35 U.S.C. § 119 to PCT International Application No. PCT/JP2019/027302 filed on Jul. 10, 2019, Japanese Patent Application No. 2018-161651 filed on Aug. 30, 2018. Each of the above application(s) is hereby expressly incorporated by reference, in its entirety, into the present application.

BACKGROUND I/F THE INVENTION

1. Field of the Invention

The present disclosure relates to an image capturing device, an image capturing method, and a non-transitory computer readable medium for storing a program.

2. Description of the Related Art

In related art, for camera shake correction, there is known an image capturing device having a shake correction function in both of an imaging lens and an image capturing device main body.

As a technique related to such an image capturing device, there is disclosed an image capturing device in which shake correction is shared and performed by an image capturing device main body and an imaging lens without division of frequency bands (refer to JP2010-91792A).

Further, there is disclosed an image capturing device that corrects a low frequency portion of a shake amount of an image shake by using a shake correction function of an image capturing device main body and corrects a high frequency portion of the shake amount of the image shake by using a shake correction function of an imaging lens (refer to JP2017-161891A).

SUMMARY I/F THE INVENTION

However, in the technique in which shake correction is shared and performed by the image capturing device main body and the imaging lens without division of frequency bands, there may be an uncorrectable portion of the detected shake, and as a result, there is a case where the shake cannot be accurately corrected.

On the other hand, in the technique in which correction of a shake in different frequency bands is performed by the image capturing device main body and the imaging lens, there is a case where the shake cannot be accurately corrected, such as a case where a shake amount is relatively large.

The present disclosure has been made in consideration of the above circumstances, and an object of the present disclosure is to provide an image capturing device, an image capturing method, and a non-transitory computer readable medium for storing a program capable of accurately correcting a shake.

In order to achieve the above object, according to an aspect of the present disclosure, there is provided an image capturing device including: an imaging lens; an image capturing device main body including an imaging element that captures an optical image transmitting through the imaging lens; a first correction unit that performs correction of an image shake by a correction lens; a second correction unit that performs correction of the image shake by the image capturing device main body; and a control unit that performs a control of causing the first correction unit or the second correction unit to correct a low frequency portion of a shake amount of the image shake having a frequency lower than a predetermined frequency and causing the first correction unit and the second correction unit to share and correct a high frequency portion of the shake amount of the image shake having a frequency equal to or higher than the predetermined frequency.

The image capturing device according to the present disclosure may further include a first detection unit that detects a shake amount of the imaging lens and a second detection unit that detects a shake amount of the image capturing device main body. In a case where a shake amount detection performance by the first detection unit and a shake amount detection performance by the second detection unit are different from each other, the control unit may perform the control by using at least one of the shake amount detected by the first detection unit or the shake amount detected by the second detection unit, as the shake amount of the image shake.

Further, in the image capturing device according to the present disclosure, in a case where the shake amount detection performance by the first detection unit is higher than the shake amount detection performance by the second detection unit, the control unit may performs a control of causing the first correction unit to correct the low frequency portion, and in a case where the shake amount detection performance by the second detection unit is higher than the shake amount detection performance by the first detection unit, the control unit may perform a control of causing the second correction unit to correct the low frequency portion.

Further, in the image capturing device according to the present disclosure, the first detection unit and the second detection unit may include a high pass filter, and the predetermined frequency may be a cutoff frequency of the high pass filter included in any one of the first detection unit and the second detection unit that has the lower shake amount detection performance.

Further, in the image capturing device according to the present disclosure, the control unit may include a first control unit that is provided in the imaging lens and controls the first correction unit and a second control unit that is provided in the image capturing device main body and controls the second correction unit.

Further, in the image capturing device according to the present disclosure, the control unit may perform a control of causing the first correction unit and the second correction unit to share and correct the high frequency portion according to a ratio between a maximum value of a correction amount by the first correction unit and a maximum value of a correction amount by the second correction unit.

On the other hand, in order to achieve the above object, according to another aspect of the present disclosure, there is provided an image capturing method performed by an image capturing device including an imaging lens, an image capturing device main body including an imaging element that captures an optical image transmitting through the imaging lens, a first correction unit that performs correction of an image shake by a correction lens, and a second correction unit that performs correction of the image shake by the image capturing device main body, the method including: performing a control of causing the first correction unit or the second correction unit to correct a low frequency portion of a shake amount of the image shake having a frequency lower than a predetermined frequency and causing the first correction unit and the second correction unit to share and correct a high frequency portion of the shake amount of the image shake having a frequency equal to or higher than the predetermined frequency.

Further, in order to achieve the above object, according to still another aspect of the present disclosure, there is provided a non-transitory computer readable medium for storing a program for causing a computer controlling an image capturing device to execute a process, the image capturing device including an imaging lens, an image capturing device main body including an imaging element that captures an optical image transmitting through the imaging lens, a first correction unit that performs correction of an image shake by a correction lens, and a second correction unit that performs correction of the image shake by the image capturing device main body, the process including: performing a control of causing the first correction unit or the second correction unit to correct a low frequency portion of a shake amount of the image shake having a frequency lower than a predetermined frequency and causing the first correction unit and the second correction unit to share and correct a high frequency portion of the shake amount of the image shake having a frequency equal to or higher than the predetermined frequency.

Further, according to still another aspect of the present disclosure, there is provided an image capturing device including: an imaging lens; an image capturing device main body including an imaging element that captures an optical image transmitting through the imaging lens; a first correction unit that performs correction of an image shake by a correction lens; a second correction unit that performs correction of the image shake by the image capturing device main body; a memory that stores a command to be executed by a computer; and a processor configured to execute the stored command, and in which the processor performs a control of causing the first correction unit or the second correction unit to correct a low frequency portion of a shake amount of the image shake having a frequency lower than a predetermined frequency and causing the first correction unit and the second correction unit to share and correct a high frequency portion of the shake amount of the image shake having a frequency equal to or higher than the predetermined frequency.

According to the present disclosure, it is possible to accurately correct a shake.

DESCRIPTION OF THE PREFERRED EMBODIMENTS

Hereinafter, an example of an embodiment for performing a technique according to the present disclosure will be described in detail with reference to the drawings. In the following, shake correction by an imaging lens is referred to as optical image stabilizer (OIS), and shake correction by an image capturing device main body is referred to as body image stabilizer (BIS).

First, before explaining details of the embodiment, a problem in a case where shake correction is performed by OIS and BIS without division of frequency bands and a problem in a case where shake correction is performed in different frequency bands by OIS and BIS will be described. Here, for easy understanding of the description, a case where a shake having a frequency equal to or higher than 0.1 Hz can be corrected by BIS and a shake having a frequency equal to or higher than 0.3 Hz can be corrected by OIS will be described as an example. A lower limit value of the frequency band in which a shake can be corrected by OIS and BIS is determined, for example, according to shake detection performances of detection units that detect a shake and are included in each of the image capturing device main body and the imaging lens.

Figure 1:
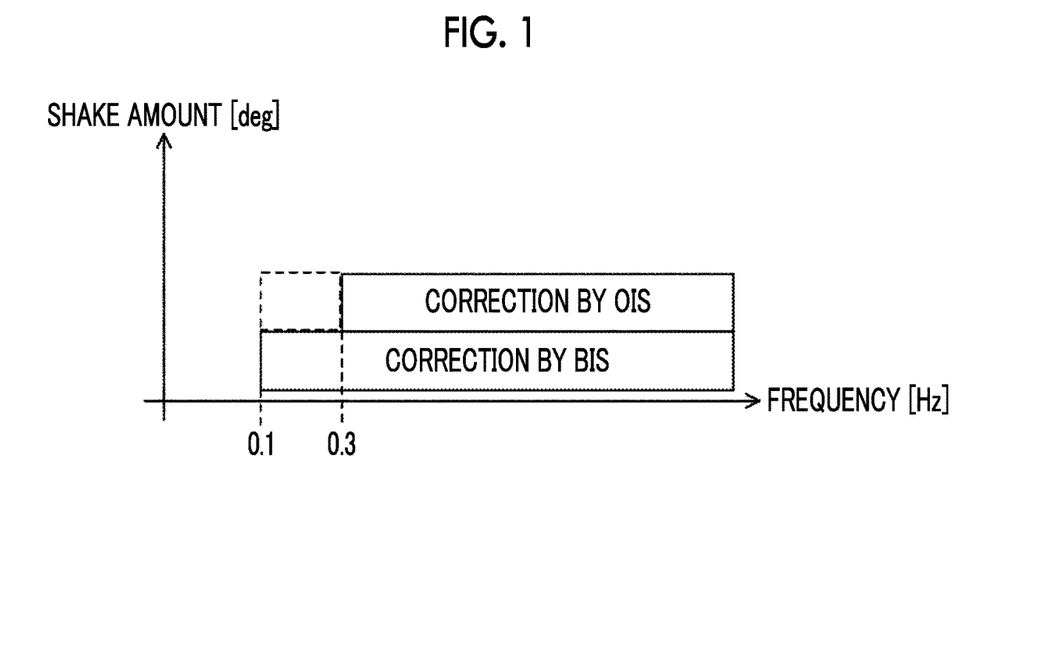
FIG. 1 is a diagram for explaining a problem in a case where shake correction is performed by OIS and BIS without division of frequency bands.

As illustrated in FIG. 1, in a case where shake correction is shared by a predetermined share ratio (in an example of FIG. 1, 1:1) without frequency division and is performed by OIS and BIS, a shake in a frequency band equal to or higher than 0.1 Hz and lower than 0.3 Hz can be corrected by only 50%. This is because a shake having a frequency lower than 0.3 Hz cannot be corrected by OIS. In FIG. 1, a portion in which a shake in a frequency band equal to or higher than 0.1 Hz and lower than 0.3 Hz cannot be corrected is illustrated by a broken-line rectangle.

Figure 2:
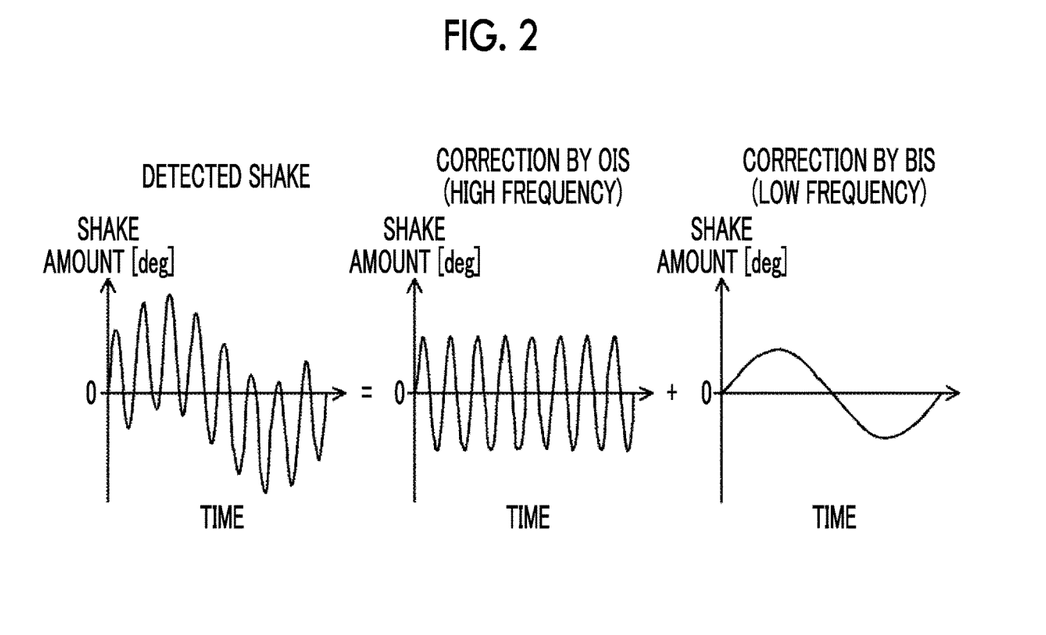
FIG. 2 is a conceptual diagram of processing of performing correction of a shake in different frequency bands by OIS and BIS.
Figure 3:
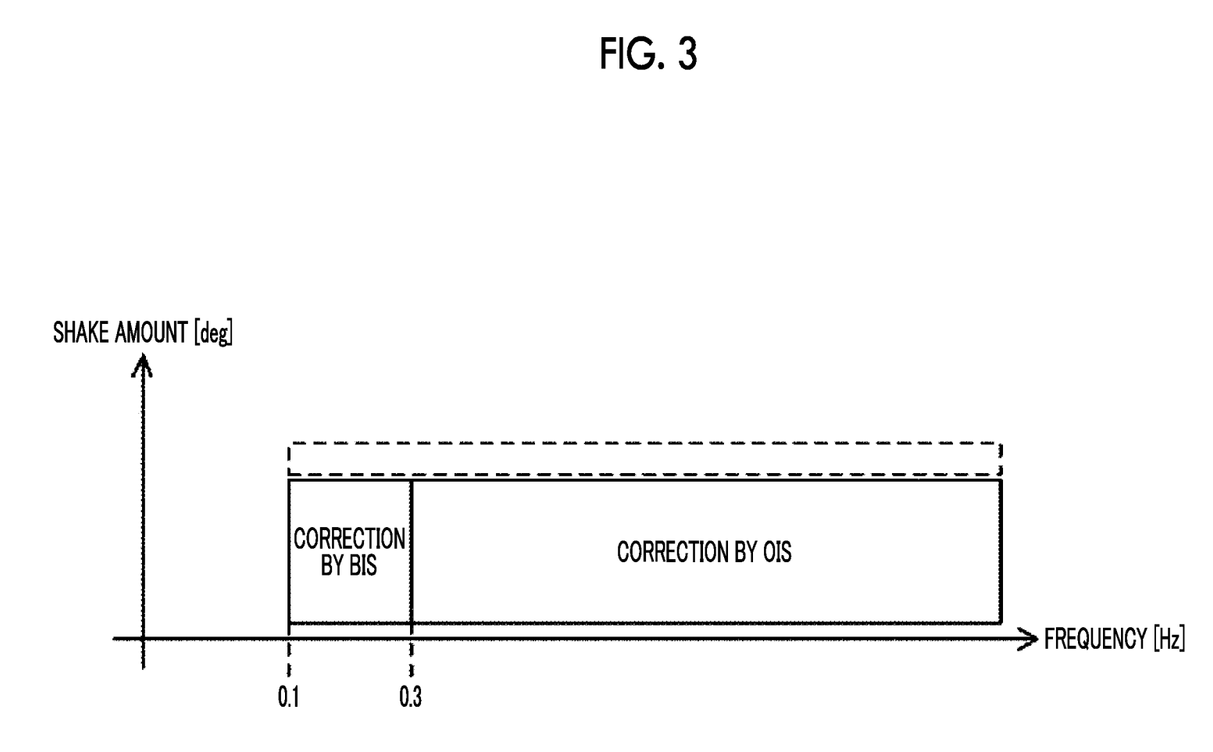
FIG. 3 is a diagram for explaining a problem in a case where correction of a shake in different frequency bands is performed by OIS and BIS.

On the other hand, as illustrated in FIG. 2, a case where a portion of a detected shake having a high frequency equal to or higher than 0.3 Hz is corrected by OIS and a portion of the detected shake having a low frequency equal to or higher than 0.1 Hz and lower than 0.3 Hz is corrected by BIS is considered. In this case, as illustrated in FIG. 3, in a case where the shake amount is relatively large, a portion of the shake that exceeds a maximum value of a shake correction amount by OIS and a maximum value of a shake correction amount by BIS cannot be corrected. In FIG. 3, the uncorrectable portion is illustrated by a broken-line rectangle. Further, FIG. 3 illustrates an example in a case where the maximum value of the shake correction amount by OIS and the maximum value of the shake correction amount by BIS are the same value.

Therefore, in the present embodiment, a low frequency portion of the shake amount of the image shake that has a frequency lower than a predetermined frequency is corrected by OIS or BIS, and a high frequency portion of the shake amount of the image shake that has a frequency equal to or higher than the predetermined frequency is shared and corrected by both of OIS and BIS.

Figure 4:
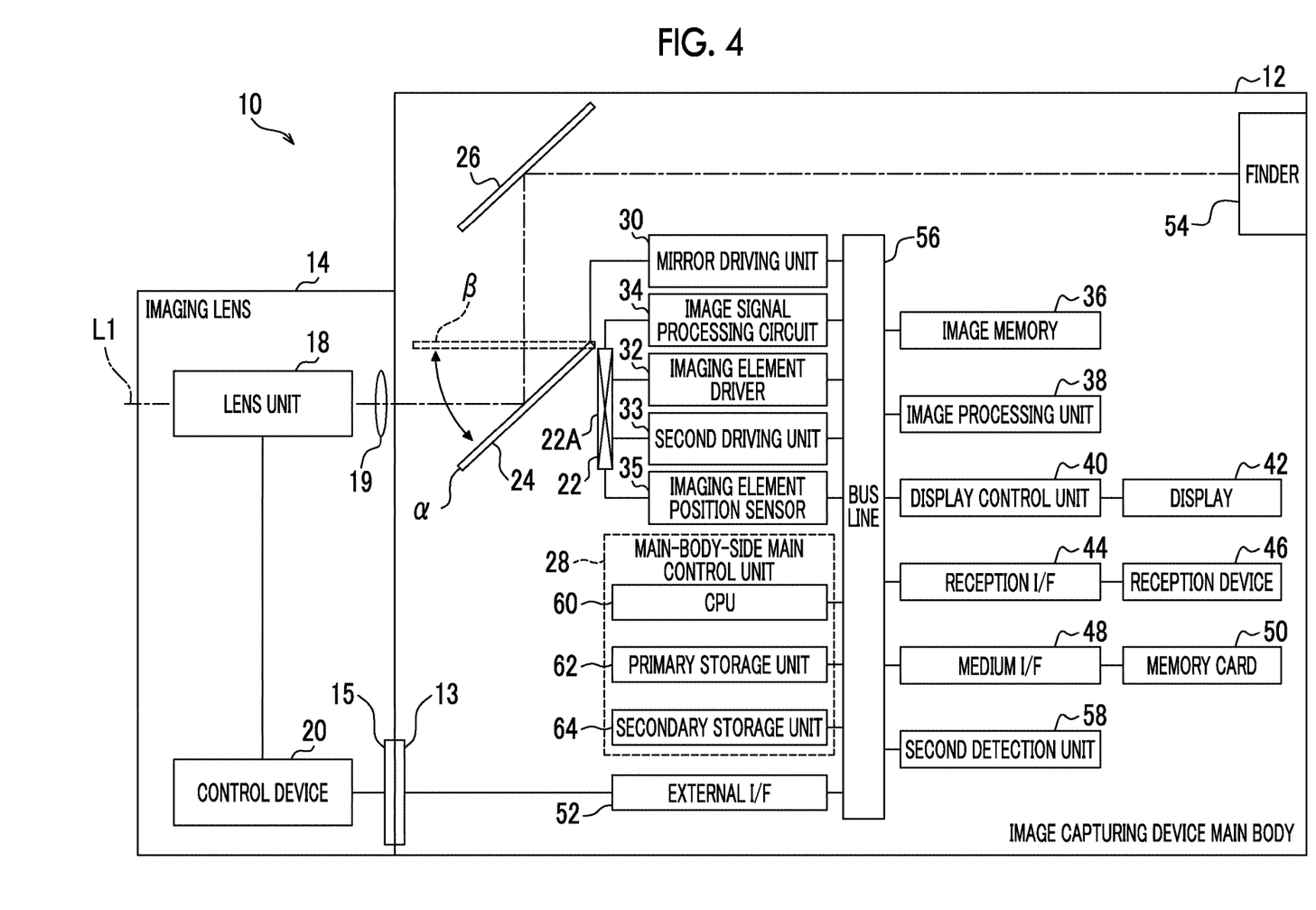
FIG. 4 is a block diagram illustrating an example of a hardware configuration of an image capturing device according to an embodiment.

Next, a configuration of an image capturing device 10 according to the present embodiment will be described with reference to FIGS. 4 and 5. As illustrated in FIG. 4, the image capturing device 10 is a lens interchangeable type digital camera, and includes an image capturing device main body 12 and an imaging lens 14. The imaging lens 14 is interchangeably attached to the image capturing device main body 12.

The image capturing device 10 according to the present embodiment has a still image capturing mode and a moving image capturing mode as operation modes of an image capturing system. The still image capturing mode is an operation mode for recording a still image obtained by capturing an image of a subject, and the moving image capturing mode is an operation mode for recording a moving image obtained by capturing an image of a subject.

In the image capturing device 10, the still image capturing mode and the moving image capturing mode are selectively set according to an instruction which is input to the image capturing device 10 by a user. In the still image capturing mode, a manual focus mode and an auto focus mode are selectively set according to an instruction which is input to the image capturing device 10 by a user. In the following, auto focus is referred to as "auto focus (AF)".

In the AF mode, an image capturing condition is adjusted by half pressing a release button (not illustrated) provided in the image capturing device main body 12, and then main exposure is performed in a case where the release button is continuously and fully pressed. In other words, in a case where the release button is half pressed, an auto exposure (AE) function is enabled and an exposure state is set. Then, an AF function is enabled and a focus control is performed. In this state, in a case where the release button is fully pressed, image capturing is performed.

The image capturing device main body 12 includes a mount 13, and the imaging lens 14 includes a mount 15. The mount 15 is coupled to the mount 13, and thus the imaging lens 14 is interchangeably attached to the image capturing device main body 12. The imaging lens 14 includes a lens unit 18, a diaphragm 19, and a control device 20. The diaphragm 19 is provided closer to the image capturing device main body 12 than the lens unit 18, adjusts a light amount of subject light transmitting through the lens unit 18, and guides the subject light into the image capturing device main body 12. The control device 20 is electrically connected to the image capturing device main body 12 via the mounts 13 and 15, and controls the entire imaging lens 14 according to an instruction from the image capturing device main body 12.

The image capturing device main body 12 includes an imaging element 22, a first mirror 24, a second mirror 26, a main-body-side main control unit 28, a mirror driving unit 30, an imaging element driver 32, an image signal processing circuit 34, an image memory 36, an image processing unit 38, a display control unit 40, and a display 42. The image capturing device main body 12 further includes a reception interface (I/F) 44, a reception device 46, a medium I/F 48, a memory card 50, an external I/F 52, and a finder 54. The image capturing device main body 12 further includes a second driving unit 33, an imaging element position sensor 35, and a second detection unit 58. The imaging element 22 is an example of an imaging element that captures an optical image transmitting through the imaging lens 14.

The main-body-side main control unit 28 is an example of a computer controlling the image capturing device 10, and includes a central processing unit (CPU) 60, a primary storage unit 62, and a secondary storage unit 64.

The CPU 60 controls the entire image capturing device 10. The primary storage unit 62 is a volatile memory used as a work area or the like in execution of various programs. As an example of the primary storage unit 62, a random access memory (RAM) may be used. The secondary storage unit 64 is a non-volatile memory that stores various programs and various parameters in advance. As an example of the secondary storage unit 64, a flash memory may be used.

The CPU 60, the primary storage unit 62, and the secondary storage unit 64 are connected to a bus line 56. Further, the mirror driving unit 30, the imaging element driver 32, the image signal processing circuit 34, the image memory 36, the image processing unit 38, the display control unit 40, the reception I/F 44, the medium I/F 48, and the external I/F 52 are also connected to the bus line 56. Further, the second driving unit 33, the imaging element position sensor 35, and the second detection unit 58 are also connected to the bus line 56.

The first mirror 24 is a movable mirror that is interposed between a light receiving surface 22A of the imaging element 22 and the lens unit 18 and is movable between a light-receiving-surface covering position α and a light-receiving-surface open position β. The first mirror 24 is connected to the mirror driving unit 30, and the mirror driving unit 30 selectively disposes the first mirror 24 at the light-receiving-surface covering position α and the light-receiving-surface open position β by driving the first mirror 24 under a control of the CPU 60. That is, the first mirror 24 is disposed at the light-receiving-surface covering position α by the mirror driving unit 30 in a case where subject light is not received to the light receiving surface 22A, and the first mirror 24 is disposed at the light-receiving-surface open position β by the mirror driving unit 30 in a case where subject light is received to the light receiving surface 22A.

At the light-receiving-surface covering position α, the first mirror 24 covers the light receiving surface 22A, and reflects subject light guided from the lens unit 18 and guides the reflected subject light to the second mirror 26. The second mirror 26 reflects the subject light guided from the first mirror 24, and guides the reflected subject light to the finder 54 via an optical system (not illustrated). The finder 54 transmits the subject light guided by the second mirror 26. At the light-receiving-surface open position (3, a state where the light receiving surface 22A is covered by the first mirror 24 is released, and the subject light is received by the light receiving surface 22A without being reflected by the first mirror 24.

The imaging element driver 32 is connected to the imaging element 22, and supplies a driving pulse to the imaging element 22 under a control of the CPU 60. Each pixel of the imaging element 22 is driven according to the driving pulse supplied by the imaging element driver 32. In the present embodiment, as the imaging element 22, a charge coupled device (CCD) image sensor is used. On the other hand, the technique according to the present disclosure is not limited thereto, and for example, other image sensors such as a complementary metal oxide semiconductor (CMOS) image sensor may be used.

The image signal processing circuit 34 reads an image signal for one frame from the imaging element 22 for each pixel under a control of the CPU 60. The image signal processing circuit 34 performs, on the read image signal, various processing such as sampling two correlation pile processing, automatic gain adjustment, and A/D conversion. The image signal processing circuit 34 outputs, a digital image signal obtained by performing various processing on the image signal, to the image memory 36, for each frame at a predetermined frame rate (for example, several tens of frames/seconds) defined by a clock signal supplied from the CPU 60. The image memory 36 temporarily holds the image signal which is input from the image signal processing circuit 34.

The image processing unit 38 acquires the image signal from the image memory 36 for each frame at a predetermined frame rate, and performs, on the acquired image signal, various processing such as gamma correction, brightness and chroma conversion, and compression processing. Further, the image processing unit 38 outputs, to the display control unit 40, the image signal obtained by performing various processing for each frame at a predetermined frame rate. Further, the image processing unit 38 outputs, to the CPU 60, the image signal obtained by performing various processing, according to a request from the CPU 60.

The display control unit 40 is connected to the display 42, and controls the display 42 under a control of the CPU 60. Further, the display control unit 40 outputs, to the display 42, the image signal which is input from the image processing unit 38 for each frame at a predetermined frame rate. The display 42 displays, as a live view image, an image represented by the image signal which is input from the display control unit 40 at a predetermined frame rate. The display 42 also displays a still image that is a single frame image obtained by capturing an image in a single frame. In addition to the live view image, the display 42 also displays a menu screen and the like.

The reception device 46 includes a dial, a release button, a cross key, a menu key, a touch panel, and the like, which are not illustrated, and receives various instructions from the user. The reception device 46 is connected to the reception I/F 44, and outputs an instruction content signal indicating contents of a received instruction to the reception I/F 44. The reception I/F 44 outputs, to the CPU 60, the instruction content signal which is input from the reception device 46. The CPU 60 executes processing according to the instruction content signal which is input from the reception I/F 44.

The medium I/F 48 is connected to the memory card 50, and records and reads an image file to and from the memory card 50 under a control of the CPU 60. The image file which is read from the memory card 50 by the medium I/F 48 is decompressed by the image processing unit 38 under a control of the CPU 60, and is displayed on the display 42 as a reproduction image.

As the mount 15 is connected to the mount 13, the external I/F 52 is connected to the control device 20 of the imaging lens 14, and performs transmission/reception of various information between the CPU 60 and the control device 20.

The second driving unit 33 moves the imaging element 22 under a control of the CPU 60. In the present embodiment, the second driving unit 33 moves the imaging element 22 in a plane perpendicular to an optical axis L1 (for example, in an XY plane in a case where the optical axis L1 is a Z axis). Thereby, the second driving unit 33 performs image shake correction. The second driving unit 33 is an example of a second correction unit that performs image shake correction in the image capturing device main body 12. The image shake correction performed by moving the imaging element 22 by the second driving unit 33 corresponds to BIS described above. The second driving unit 33 is not particularly limited as long as the second driving unit 33 is a member capable of moving the imaging element 22. For example, as the second driving unit 33, a member using a magnet and a hall element may be applied, or an actuator including a stepping motor, an ultrasonic motor, or the like may be applied.

The imaging element position sensor 35 detects a position of the imaging element 22 in the plane perpendicular to the optical axis L1. The position of the imaging element 22 detected by the imaging element position sensor 35 is used in a case where the second driving unit 33 moves the imaging element 22. The imaging element position sensor 35 is not particularly limited as long as the imaging element position sensor 35 is a sensor that can detect the position of the imaging element 22 in the plane perpendicular to the optical axis L1. For example, as the imaging element position sensor 35, a magnetic sensor may be applied, or an optical sensor may be applied.

The second detection unit 58 is fixedly provided in the image capturing device main body 12, and detects a shake amount of the image capturing device main body 12. A detailed configuration of the second detection unit 58 will be described later.

Figure 5:
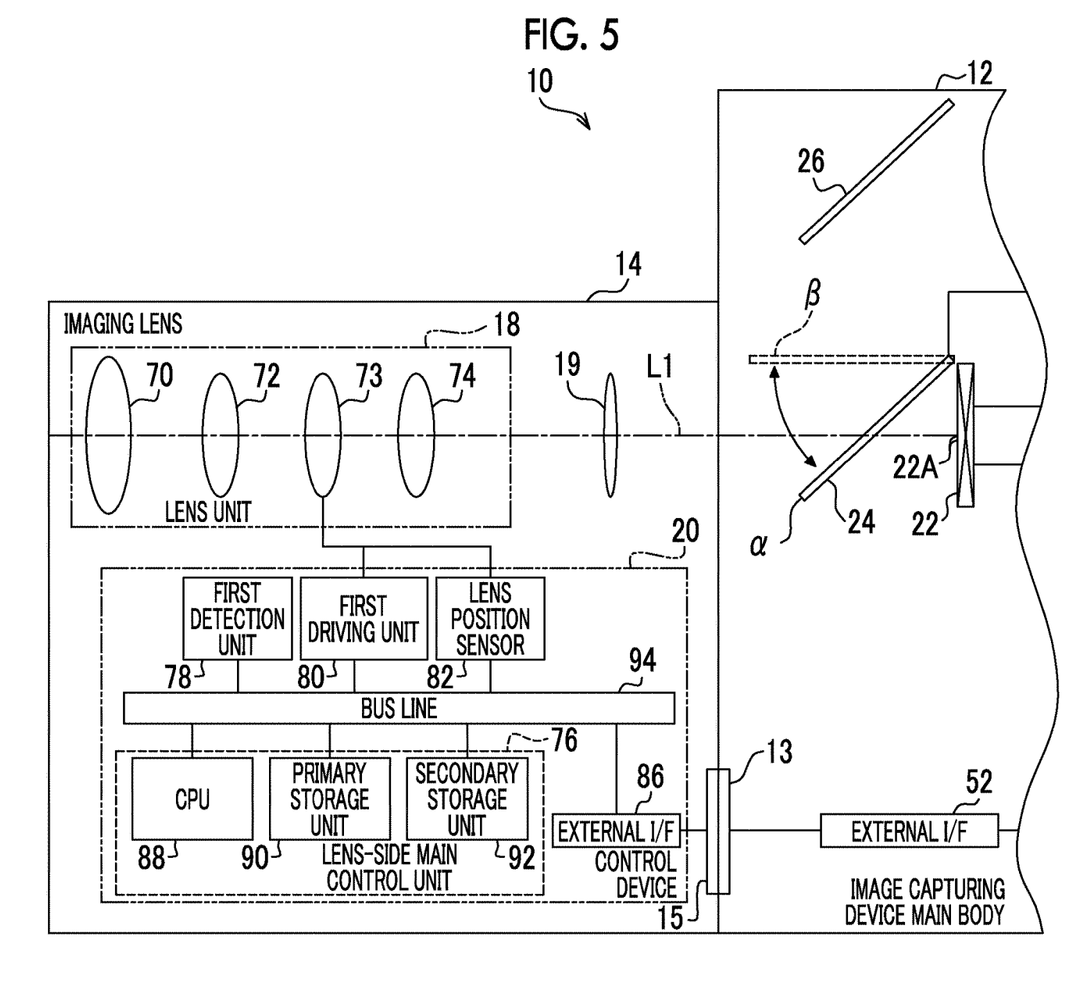
FIG. 5 is a block diagram illustrating an example of a hardware configuration of an imaging lens included in the image capturing device according to the embodiment.

As an example, as illustrated in FIG. 5, the lens unit 18 according to the present embodiment includes a light-incident lens 70, a zoom lens 72, a correction lens 73, and a focus lens 74. The light-incident lens 70, the zoom lens 72, the correction lens 73, and the focus lens 74 are provided along the optical axis L1, and the focus lens 74, the correction lens 73, the zoom lens 72, and the light-incident lens 70 are provided in this order from the diaphragm 19 along the optical axis L1.

The subject light is incident on the light-incident lens 70. The light-incident lens 70 transmits the subject light, and guides the subject light to the zoom lens 72. The zoom lens 72 according to the present embodiment includes a plurality of lenses that can move along the optical axis L1. By adjusting a state of the zoom lens 72, a focal length of the imaging lens 14 (hereinafter, simply referred to as a "focal length") is adjusted. Specifically, in the zoom lens 72, by rotating a zoom ring (not illustrated) provided in the imaging lens 14, the lenses move closer or move away to and from each other along the optical axis L1, and thus a positional relationship between the lenses along the optical axis L1 is adjusted. Therefore, the focal length is adjusted. The zoom lens 72 transmits the subject light which is incident from the light-incident lens 70, and guides the subject light to the correction lens 73.

The correction lens 73 is a lens that can move in the plane perpendicular to the optical axis L1 (for example, in the XY plane in a case where the optical axis L1 is the Z axis), and corrects an image shake by moving in the plane perpendicular to the optical axis L1. The correction lens 73 transmits the subject light which is incident from the zoom lens 72, and guides the subject light to the focus lens 74.

The focus lens 74 is a lens that can move along the optical axis L1, and changes a focus of a subject image formed on the light receiving surface 22A of the imaging element 22 by moving along the optical axis L1. In the following, a position of the focus lens 74 along the optical axis L1 is simply described as a position of the focus lens 74. The focus lens 74 transmits the subject light which is incident from the correction lens 73, and guides the subject light to the diaphragm 19. The diaphragm 19 adjusts a light amount of the subject light which is incident from the focus lens 74, transmits the subject light, and guides the subject light to the image capturing device main body 12.

The control device 20 of the imaging lens 14 includes a lens-side main control unit 76, a first detection unit 78, a first driving unit 80, a lens position sensor 82, and an external I/F 86.

The lens-side main control unit 76 includes a CPU 88, a primary storage unit 90, and a secondary storage unit 92. The CPU 88 controls the entire imaging lens 14. The primary storage unit 90 is a volatile memory used as a work area or the like in execution of various programs. As an example of the primary storage unit 90, a RAM is used. The secondary storage unit 92 is a non-volatile memory that stores various programs and various parameters in advance. As an example of the secondary storage unit 92, a flash memory is used.

The CPU 88, the primary storage unit 90, and the secondary storage unit 92 are connected to a bus line 94. Further, the first detection unit 78, the first driving unit 80, the lens position sensor 82, and the external I/F 86 are connected to the bus line 94.

As the mount 15 is connected to the mount 13, the external I/F 86 is connected to the external I/F 52 of the image capturing device main body 12, and performs transmission and reception of various information between the CPU 88 and the CPU 60 of the image capturing device main body 12 in cooperation with the external I/F 52.

The first detection unit 78 is fixedly provided in the imaging lens 14, and detects a shake amount of the imaging lens 14. A detailed configuration of the first detection unit 78 will be described later.

The first driving unit 80 moves the correction lens 73 under a control of the CPU 88. In the present embodiment, the first driving unit 80 moves the correction lens 73 in the plane perpendicular to the optical axis L1. Thereby, the first driving unit 80 performs image shake correction. The first driving unit 80 is an example of a first correction unit that performs image shake correction in the correction lens 73. The image shake correction performed by moving the correction lens 73 by the first driving unit 80 corresponds to OIS described above. The first driving unit 80 is not particularly limited as long as the first driving unit 80 is a member that can move the correction lens 73. For example, as the first driving unit 80, a member using a magnet and a hall element may be applied, or an actuator including a stepping motor, an ultrasonic motor, or the like may be applied.

The lens position sensor 82 detects a position of the correction lens 73 in the plane perpendicular to the optical axis L1. The position of the correction lens 73 detected by the lens position sensor 82 is used in a case where the correction lens 73 is moved by the first driving unit 80. The lens position sensor 82 is not particularly limited as long as the lens position sensor 82 is a sensor that can detect the position of the correction lens 73 in the plane perpendicular to the optical axis L1. For example, as the lens position sensor 82, a magnetic sensor may be applied, or an optical sensor may be applied.

Figure 6:
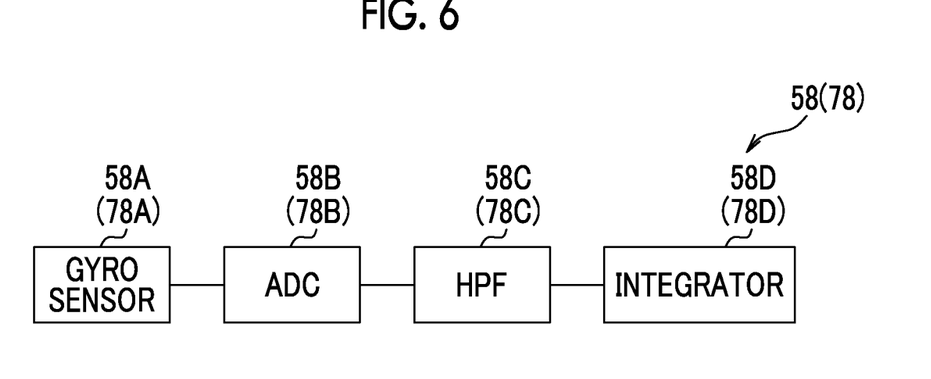
FIG. 6 is a block diagram illustrating an example of a configuration of a first detection unit and a second detection unit according to the embodiment.

Next, configurations of the first detection unit 78 and the second detection unit 58 according to the present embodiment will be described with reference to FIG. 6. As illustrated in FIG. 6, the second detection unit 58 includes a gyro sensor 58A, an analog-to-digital converter (ADC) 58B, a high pass filter (in FIG. 6, denoted by HPF) 58C, and an integrator 58D. The gyro sensor 58A detects an angular velocity [deg/sec] of the image capturing device main body 12, and outputs an analog signal indicating the detected angular velocity to the ADC 58B.

The ADC 58B converts the analog signal indicating the angular velocity which is input from the gyro sensor 58A into a digital signal, and outputs the digital signal indicating the angular velocity obtained by the conversion to the high pass filter 58C. The high pass filter 58C cuts off components having a frequency lower than a cutoff frequency and outputs components having a frequency equal to or higher than the cutoff frequency to the integrator 58D among components of the digital signal indicating the angular velocity which is input from the ADC 58B.

The integrator 58D outputs a shake amount [deg] of the image capturing device main body 12 by integrating the digital signal which is input from the high pass filter 58C.

Further, the first detection unit 78 includes a gyro sensor 78A, an ADC 78B, a high pass filter 78C, and an integrator 78D. The gyro sensor 78A, the ADC 78B, the high pass filter 78C, and the integrator 78D are components having the same functions as the gyro sensor 58A, the ADC 58B, the high pass filter 58C, and the integrator 58D, and thus descriptions thereof will be omitted.

With the above configuration, the first detection unit 78 detects a shake amount of the imaging lens 14, and the second detection unit 58 detects a shake amount of the image capturing device main body 12.

Figure 7:
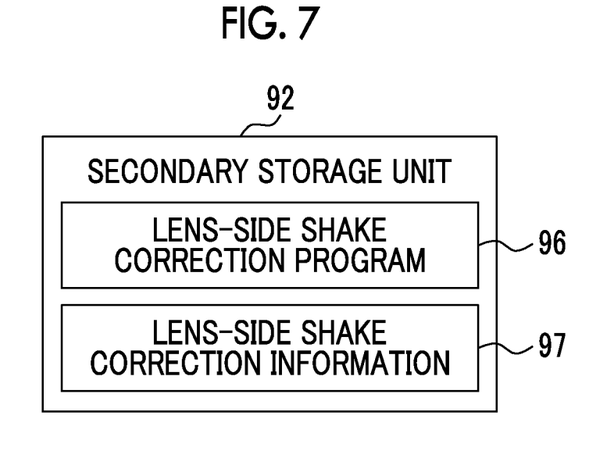
FIG. 7 is a conceptual diagram illustrating an example of storage contents of a secondary storage unit of a lens-side main control unit included in the imaging lens according to the embodiment.

As an example, as illustrated in FIG. 7, the secondary storage unit 92 of the lens-side main control unit 76 stores a lens-side shake correction program 96. The CPU 88 reads the lens-side shake correction program 96 from the secondary storage unit 92, develops the lens-side shake correction program 96 in the primary storage unit 90, and executes shake correction processing by the CPU 88 (refer to FIG. 9) to be described according to the developed lens-side shake correction program 96. In other words, the CPU 88 operates as a first control unit that controls the first driving unit 80 by executing the lens-side shake correction program 96.

The secondary storage unit 92 of the lens-side main control unit 76 also stores lens-side shake correction information 97. The lens-side shake correction information 97 according to the present embodiment includes a maximum value of a correction amount by the first driving unit 80 as information indicating an image shake correction performance by the first driving unit 80. The maximum value of the correction amount by the first driving unit 80 corresponds to a maximum value of a movement amount of the correction lens 73.

Further, the lens-side shake correction information 97 includes the cutoff frequency of the high pass filter 78C as information indicating a shake amount detection performance by the first detection unit 78. In the present embodiment, it is preferable to detect the shake amount having a lower frequency. Thus, it is assumed that the detection performance is higher as the cutoff frequency is lower. In general, the cutoff frequency of the high pass filter 78C is in correlation with a zero-point drift of the gyro sensor 78A. In many cases, as the zero-point drift is larger, the cutoff frequency is higher. Thus, as information indicating the shake amount detection performance by the first detection unit 78, the zero-point drift of the gyro sensor 78A may be applied. Here, the zero-point drift means a change amount in output of the gyro sensor 78A in a state where the gyro sensor 78A is stationary.

Figure 8:
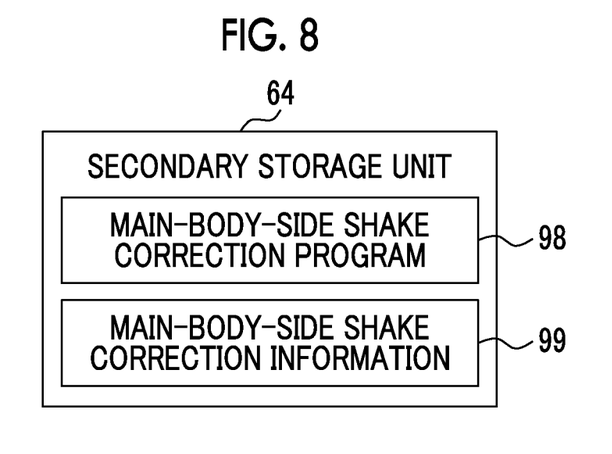
FIG. 8 is a conceptual diagram illustrating an example of storage contents of a secondary storage unit of a main-body-side main control unit included in an image capturing device main body according to the embodiment.

On the other hand, as illustrated in FIG. 8, as an example, the secondary storage unit 64 of the main-body-side main control unit 28 stores a main-body-side shake correction program 98. The CPU 60 reads the main-body-side shake correction program 98 from the secondary storage unit 64, develops the main-body-side shake correction program 98 in the primary storage unit 62, and executes shake correction processing (refer to FIG. 9) to be described according to the developed main-body-side shake correction program 98. In other words, the CPU 60 operates as a second control unit that controls the second driving unit 33 by executing the main-body-side shake correction program 98.

The secondary storage unit 64 of the main-body-side main control unit 28 also stores main-body-side shake correction information 99. The main-body-side shake correction information 99 according to the present embodiment includes a maximum value of a correction amount by the second driving unit 33 as information indicating an image shake correction performance by the second driving unit 33. The maximum value of the correction amount by the second driving unit 33 corresponds to a maximum value of a movement amount of the imaging element 22.

Further, the main-body-side shake correction information 99 includes the cutoff frequency of the high pass filter 58C as information indicating a shake amount detection performance by the second detection unit 58. As in the first detection unit 78, as the cutoff frequency of the high pass filter 58C is lower, the shake amount detection performance by the second detection unit 58 is higher. Further, as in the first detection unit 78, as information indicating the shake amount detection performance by the second detection unit 58, the zero-point drift of the gyro sensor 58A may be applied.

Figure 9:
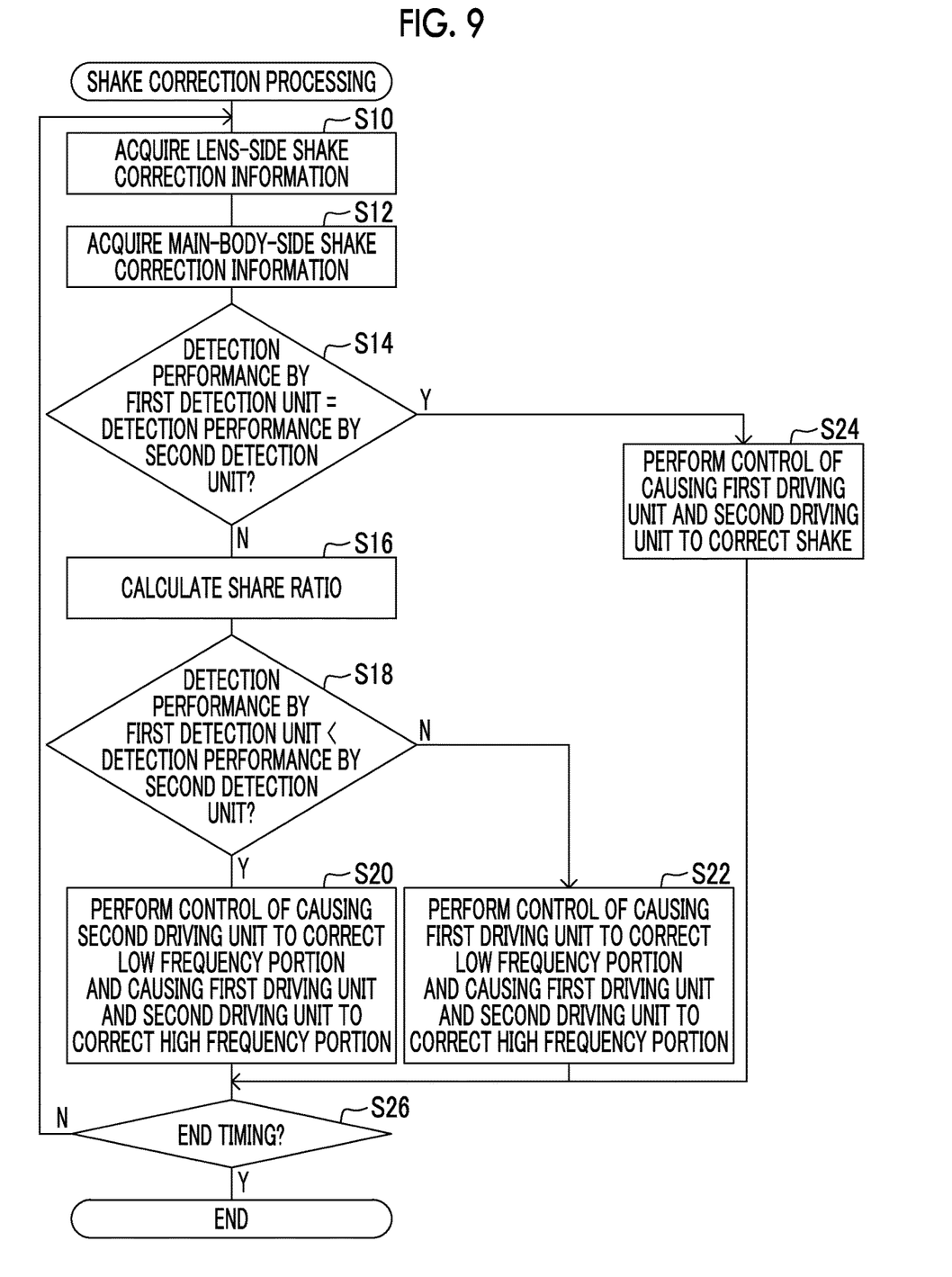
FIG. 9 is a flowchart illustrating an example of shake correction processing according to the embodiment.

Next, an operation of the image capturing device 10 according to the present embodiment will be described with reference to FIG. 9. The shake correction processing illustrated in FIG. 9 is executed, for example, in a case where a power switch of the image capturing device 10 is turned on. The shake correction processing illustrated in FIG. 9 may be executed in a case where an image capturing instruction from the user is input via the release button of the reception device 46.

In step S10 of FIG. 9, the CPU 60 acquires the lens-side shake correction information 97 via the external I/F 52. Specifically, the CPU 60 outputs, to the CPU 88, an instruction to acquire the lens-side shake correction information 97. In a case where an instruction to acquire the lens-side shake correction information 97 is input from the CPU 60, the CPU 88 acquires the lens-side shake correction information 97 from the secondary storage unit 92. The CPU 88 outputs the acquired lens-side shake correction information 97 to the CPU 60 via the external I/F 86. The CPU 60 acquires the lens-side shake correction information 97 which is input from the CPU 88.

In step S12, the CPU 60 acquires the main-body-side shake correction information 99 from the secondary storage unit 64. In step S14, the CPU 60 determines whether or not the shake amount detection performance by the first detection unit 78 and the shake amount detection performance by the second detection unit 58 are equal to each other by using the lens-side shake correction information 97 and the main-body-side shake correction information 99. Specifically, the CPU 60 determines whether or not the cutoff frequency of the high pass filter 78C included in the lens-side shake correction information 97 and the cutoff frequency of the high pass filter 58C included in the main-body-side shake correction information 99 are equal to each other. In a case where a determination result in step S14 is Yes, the processing proceeds to step S24, and in a case where a determination result in step S14 is No, the processing proceeds to step S16.

In step S16, the CPU 60 calculates α of α: (1−α), which is a share ratio in image shake correction by the first driving unit 80 and the second driving unit 33, according to the following Equation (1). In Equation (1), M1 represents a maximum value of a correction amount of image shake by the first driving unit 80, and M2 represents a maximum value of a correction amount of image shake by the second driving unit 33. In other words, the share ratio in the image shake correction by the first driving unit 80 and the second driving unit 33 corresponds to a ratio between the maximum value of the correction amount of the image shake by the first driving unit 80 and the maximum value of the correction amount of the image shake by the second driving unit 33.

$$\alpha = M1 \div (M1 + M2) \qquad (1)$$

In step S18, the CPU 60 determines whether or not the shake amount detection performance by the second detection unit 58 is higher than the shake amount detection performance by the first detection unit 78 by using the lens-side shake correction information 97 and the main-body-side shake correction information 99. Specifically, the CPU 60 determines whether or not the cutoff frequency of the high pass filter 58C included in the main-body-side shake correction information 99 is lower than the cutoff frequency of the high pass filter 78C included in the lens-side shake correction information 97. In a case where a determination result in step S18 is No, the processing proceeds to step S22, and in a case where a determination result in step S18 is Yes, the processing proceeds to step S20.

In step S20, the CPU 60 performs a control of causing the second driving unit 33 to correct a low frequency portion of the shake amount of the image shake that has a frequency lower than a predetermined frequency. Specifically, the CPU 60 acquires a shake amount detected by the second detection unit 58. The CPU 60 performs a control of causing the second driving unit 33 to correct a low frequency portion of the acquired shake amount that has a frequency lower than the cutoff frequency of the high pass filter 78C included in the first detection unit 78, which has the lower shake amount detection performance among the first detection unit 78 and the second detection unit 58. More specifically, the CPU 60 controls the second driving unit 33 to correct the low frequency portion by moving the imaging element 22 so as to cancel the low frequency portion.

Further, the CPU 60 performs a control of causing the first driving unit 80 and the second driving unit 33 to share and correct a high frequency portion of the shake amount of the image shake that has a frequency equal to or higher than the predetermined frequency. Specifically, the CPU 60 performs a control of causing the first driving unit 80 and the second driving unit 33 to share and correct a high frequency portion of the acquired shake amount that has a frequency equal to or higher than the cutoff frequency of the high pass filter 78C, according to the share ratio calculated in step S16.

More specifically, the CPU 60 controls the second driving unit 33 to move the imaging element 22 so as to cancel a shake portion obtained by multiplying a high frequency portion of the acquired shake amount that has a frequency equal to or higher than the cutoff frequency of the high pass filter 78C by (1−α) calculated in step S16. On the other hand, the CPU 60 outputs, to the CPU 88, an instruction to correct a shake portion obtained by multiplying a high frequency portion of the shake amount of the image shake that has a frequency equal to or higher than the cutoff frequency of the high pass filter 78C by a calculated in step S16, via the external I/F 52.

In a case where an instruction to correct a shake is input from the CPU 60, the CPU 88 acquires the shake amount detected by the first detection unit 78. The CPU 88 performs a control of causing the first driving unit 80 to correct a shake portion obtained by multiplying a high frequency portion of the acquired shake amount that has a frequency equal to or higher than the cutoff frequency of the high pass filter 78C by a calculated in step S16. Specifically, the CPU 88 controls the first driving unit 80 to correct a shake by moving the correction lens 73 so as to cancel a shake portion obtained by multiplying the high frequency portion by a.

In step S22, the CPU 60 performs a control of causing the first driving unit 80 to correct a low frequency portion of the shake amount of the image shake that has a frequency lower than a predetermined frequency. Specifically, the CPU 60 outputs, to the CPU 88, an instruction to correct the low frequency portion of the shake amount of the image shake that has a frequency lower than the cutoff frequency of the high pass filter 58C included in the second detection unit 58, which has the lower shake amount detection performance among the first detection unit 78 and the second detection unit 58, via the external I/F 52.

In a case where an instruction to correct a shake is input from the CPU 60, the CPU 88 acquires the shake amount detected by the first detection unit 78. The CPU 88 performs a control of causing the first driving unit 80 to correct a low frequency portion of the acquired shake amount that has a frequency lower than the cutoff frequency of the high pass filter 58C. Specifically, the CPU 88 controls the first driving unit 80 to correct the low frequency portion by moving the correction lens 73 so as to cancel the low frequency portion.

Further, the CPU 60 performs a control of causing the first driving unit 80 and the second driving unit 33 to share and correct a high frequency portion of the shake amount of the image shake that has a frequency equal to or higher than the predetermined frequency. The control in step S22 is similar to the control in step S20 except that the predetermined frequency is the cutoff frequency of the high pass filter 58C included in the second detection unit 58, which has the lower shake amount detection performance among the first detection unit 78 and the second detection unit 58, and thus a description of the control will be omitted.

In step S24, the CPU 60 performs a control of causing the first driving unit 80 and the second driving unit 33 to share and correct a shake amount of the image shake. The control in step S24 is similar to the control in step S20 except that the shake is shared and corrected by the first driving unit 80 and the second driving unit 33 without division of frequency bands, and thus a description of the control will be omitted. After the image shake correction is performed by processing of step S20, step S22, or step S24, image capturing is performed. In a case where processing of step S20, step S22, or step S24 is ended, the processing proceeds to step S26.

In step S26, the CPU 60 determines whether or not a predetermined end timing arrives. In a case where a determination result in step S26 is No, the processing returns to step S10, and in a case where a determination result in step S26 is Yes, the shake correction processing is ended. As the end timing, for example, a timing at which a power switch of the image capturing device 10 is turned off may be used. Further, as the end timing, for example, a timing at which shake correction is performed and image capturing is ended after an image capturing instruction from a user is input may be used.

As described above, according to the present embodiment, the low frequency portion of the shake amount of the image shake that has a frequency lower than the predetermined frequency is corrected by the first driving unit 80 or the second driving unit 33, and the high frequency portion of the shake amount of the image shake that has a frequency equal to or higher than the predetermined frequency is shared and corrected by the first driving unit 80 and the second driving unit 33.

Figure 10:
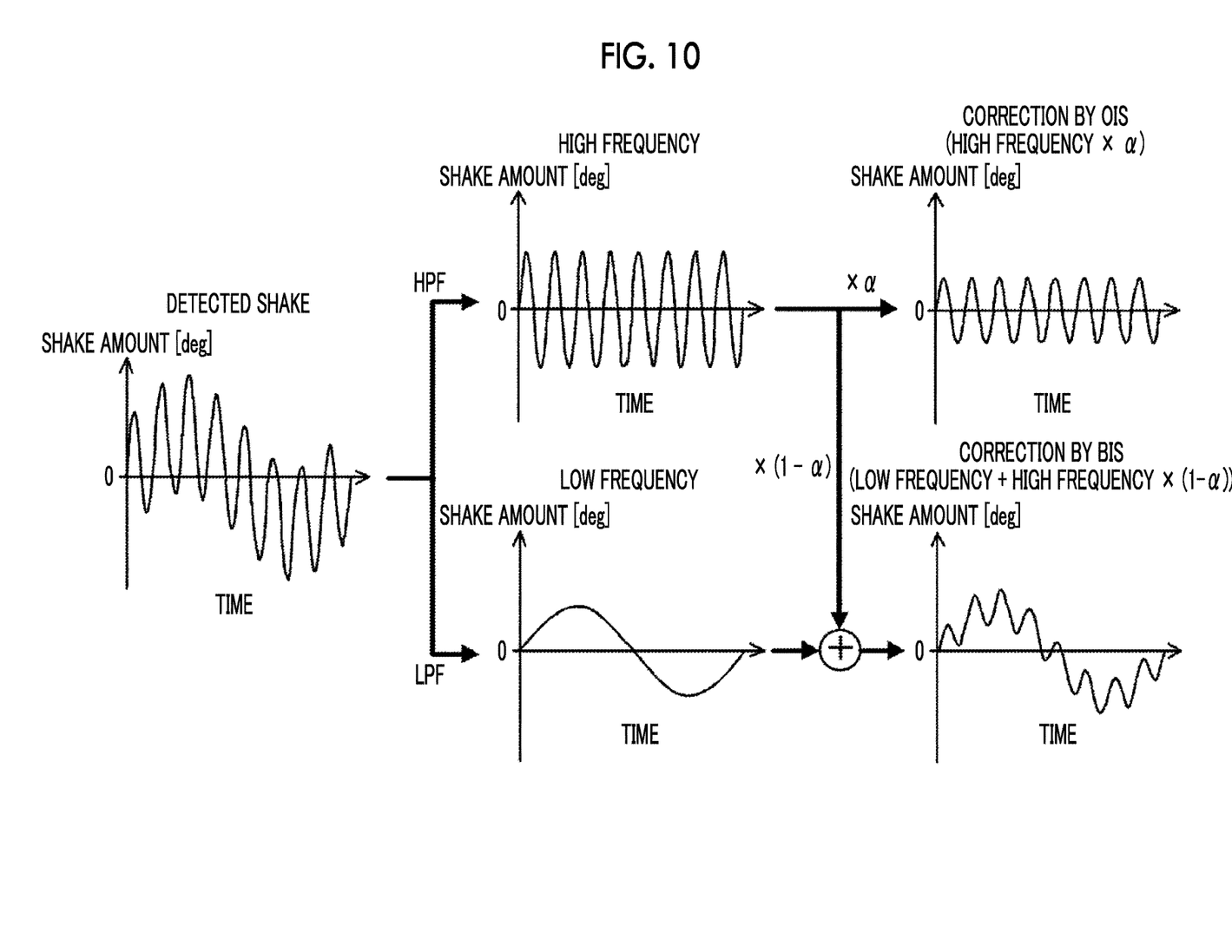
FIG. 10 is a diagram for explaining shake correction processing according to the embodiment.

Specifically, for example, in a case where the shake amount detection performance by the second detection unit 58 is higher than the shake amount detection performance by the first detection unit 78, as illustrated in FIG. 10, a shake portion obtained by multiplying the high frequency portion of the shake amount of the image shake by a is corrected by the first driving unit 80, that is, by OIS.

Further, in this case, in the shake amount of the image shake, the low frequency portion and a shake portion obtained by multiplying the high frequency portion by $(1-\alpha)$ are corrected by the second driving unit 33, that is, by BIS.

Figure 11:
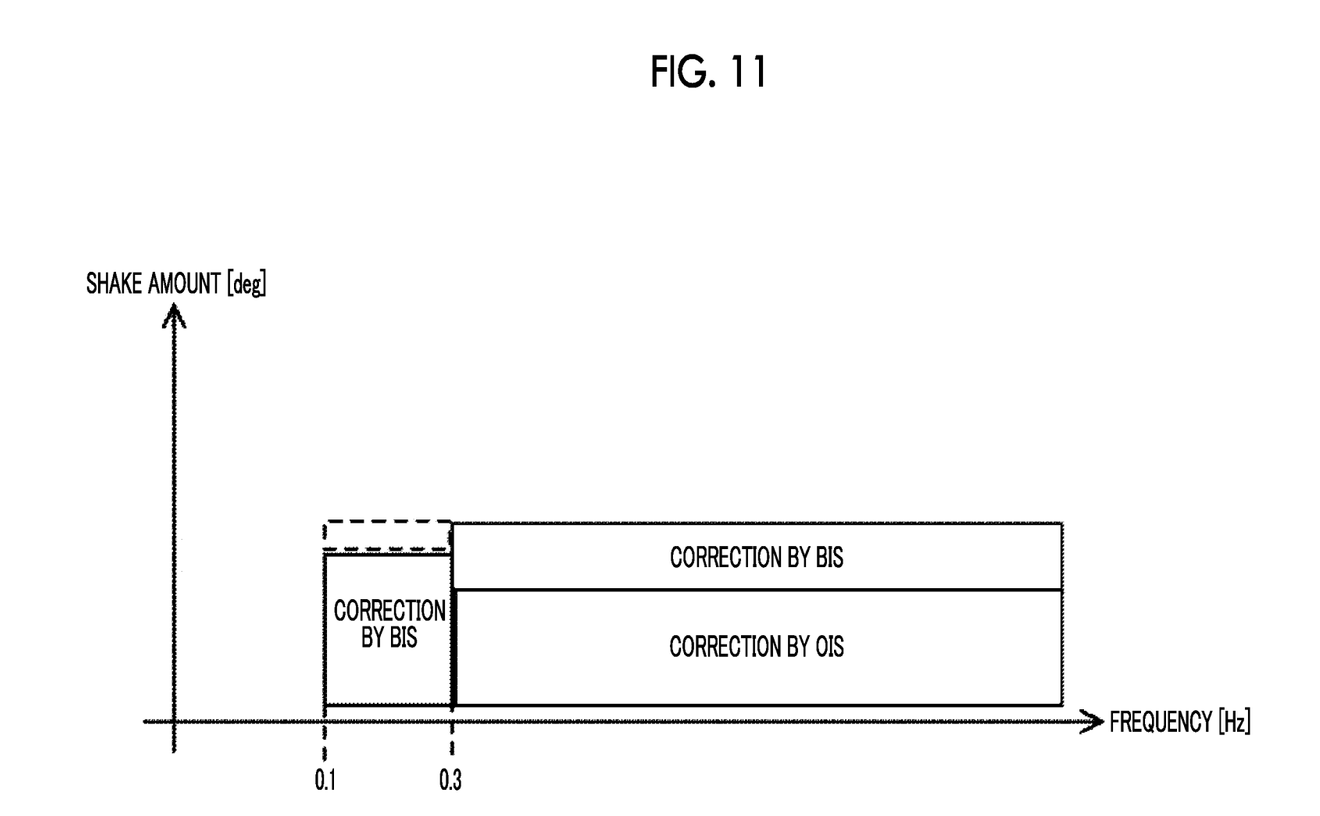
FIG. 11 is a diagram for explaining shake correction processing according to the embodiment.

Thereby, as illustrated in FIG. 11, a portion of the image shake that cannot be corrected is reduced, and thus the shake can be corrected with high accuracy. In FIG. 11, the uncorrectable portion is illustrated by a broken-line rectangle. In the example of FIG. 11, the portion of the shake that cannot be corrected corresponds to a portion of the shake that has a frequency equal to or higher than 0.1 Hz and lower than 0.3 Hz and exceeds the maximum value of the shake correction amount by the second driving unit 33.

In the embodiment, a case where two control units (in the embodiment, the main-body-Side main control unit 28 and the lens-side main control unit 76) perform a control for correcting image shake in cooperation with each other has been described. On the other hand, the present disclosure is not limited thereto. For example, a form in which one control unit performs a control for correcting image shake may be adopted. In this case, a form in which the main-body-side main control unit 28 directly controls the first driving unit 80 may be adopted as an example.

Further, in the embodiment, a case where the CPU 60 executes the shake correction processing illustrated in FIG. 9 and the CPU 88 performs a control for correcting the image shake according to an instruction from the CPU 60 has been described. On the other hand, the present disclosure is not limited thereto. For example, the CPU 88 may execute the shake correction processing illustrated in FIG. 9, and the CPU 60 may perform a control for correcting the image shake according to an instruction from the CPU 88.

Further, in the embodiment, a case where the main-body-side main control unit 28 that controls the entire image capturing device 10 performs a control for correcting the image shake has been described. On the other hand, the present disclosure is not limited thereto. For example, a form in which a dedicated control unit for shake correction is provided in the image capturing device main body 12 separately from the main-body-side main control unit 28 and a CPU of the dedicated control unit for shake correction executes the shake correction processing illustrated in FIG. 9 may be adopted.

Further, in the embodiment, a case where the cutoff frequency of the high pass filter included in any one of the first detection unit 78 and the second detection unit 58 that has the lower shake amount detection performance is applied as a frequency of a boundary between the low frequency portion and the high frequency portion of the shake amount of the image shake has been described. On the other hand, the present disclosure is not limited thereto. For example, a form in which a predetermined frequency (for example, 0.3 Hz) as a fixed value is applied as a frequency of a boundary between the low frequency portion and the high frequency portion of the shake amount of the image shake may be adopted.

Further, in the embodiment, a case where a ratio of a maximum value of a correction amount of the image shake by the first driving unit 80 and a maximum value of a correction amount of the image shake by the second driving unit 33 is applied as the share ratio in the case where the image shake correction is performed by being shared by the first driving unit 80 and the second driving unit 33 has been described. On the other hand, the present disclosure is not limited thereto. For example, a form in which a predetermined ratio (for example, 1:1) as a fixed value is applied as the share ratio may be adopted.

Further, in the embodiment, a case where the shake amount detected by the first detection unit 78 is used for the image shake correction by the first driving unit 80 and the shake amount detected by the second detection unit 58 is used for the image shake correction by the second driving unit 33 has been described. On the other hand, the present disclosure is not limited thereto. For example, a form in which the shake amount detected by the first detection unit 78 or the second detection unit 58 is used for the shake correction by any one of the first driving unit 80 and the second driving unit 33 may be adopted. In this case, a form in which the shake amount detected by any one of the first detection unit 78 and the second detection unit 58 that has the higher shake amount detection performance is used for the shake correction is adopted.

Further, in the embodiment, for example, as a hardware structure of a processing unit that executes various processing such as the first control unit and the second control unit, the following various processors are may be used. The various processors include, as described above, a CPU which is a general-purpose processor that functions as various processing units by executing software (program), and a dedicated electric circuit which is a processor having a circuit configuration specifically designed to execute specific processing, such as a programmable logic device (PLD) or an application specific integrated circuit (ASIC) that is a processor of which the circuit configuration may be changed after manufacturing such as a field programmable gate array (FPGA).

One processing unit may be configured by one of these various processors, or may be configured by a combination of two or more processors of the same type or different types (for example, a combination of a plurality of FPGAs or a combination of a CPU and an FPGA). Further, the plurality of processing units may be configured by one processor.

As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units by one integrated circuit (IC) chip is used may be adopted. As described above, the various processing units are configured by using one or more various processors as a hardware structure.

Further, as the hardware structure of the various processors, more specifically, an electric circuit (circuitry) in which circuit elements such as semiconductor elements are combined may be used.

Further, in the embodiment, an example in which the main-body-side shake correction program 98 is stored (installed) in the secondary storage unit 64 in advance has been described. On the other hand, the present disclosure is not limited thereto. The main-body-side shake correction program 98 may be provided by being recorded in a recording medium such as a compact disc read only memory (CD-ROM), a digital versatile disc read only memory (DVD-ROM), or a Universal Serial Bus (USB) memory. Further, the main-body-side shake correction program 98 may be downloaded from an external device via a network.

Further, in the embodiment, an example in which the lens-side shake correction program 96 is stored (installed) in the secondary storage unit 92 in advance has been described. On the other hand, the present disclosure is not limited thereto. The lens-side shake correction program 96 may be provided by being recorded in a recording medium such as a CD-ROM, a DVD-ROM, or a USB memory. Further, the lens-side shake correction program 96 may be downloaded from an external device via a network.

EXPLANATION I/F REFERENCES

10: image capturing device
12: image capturing device main body
13, 15: mount
14: imaging lens
18: lens unit
19: diaphragm
20: control device
22: imaging element
22A: light receiving surface
24: first mirror
26: second mirror
28: main-body-side main control unit
30: mirror driving unit
32: imaging element driver
33: second driving unit
34: image signal processing circuit
35: imaging element position sensor
36: image memory
38: image processing unit
40: display control unit
42: display
44: reception I/F
46: reception device
48: medium I/F
50: memory card
52, 86: external I/F
54: finder
56, 94: bus line
58: second detection unit
58A, 78A: gyro sensor
58B, 78B: ADC
58C, 78C: high pass filter
58D, 78D: integrator
60, 88: CPU
62, 90: primary storage unit
64, 92: secondary storage unit
70: light-incident lens
72: zoom lens
73: correction lens
74: focus lens
76: lens-side main control unit
78: first detection unit
80: first driving unit
82: lens position sensor
96: lens-side shake correction program
97: lens-side shake correction information
98: main-body-side shake correction program
99: main-body-side shake correction information
L1: optical axis
$\alpha$: light-receiving-surface covering position
$\beta$: light-receiving-surface open position

What is claimed is:

1. An image capturing device comprising:
   an imaging lens;
   an image capturing device body including an imaging element that captures an optical image transmitting through the imaging lens;
   a first correction device that performs correction of an image shake by a correction lens;
   a second correction device that performs correction of the image shake by the image capturing device body; and
   a processor configured to:
   control the first correction device or the second correction device to correct a first frequency portion of a shake amount of the image shake having a first frequency and;
   control both the first correction device and the second correction device to correct a second frequency portion of the shake amount of the image shake having a second frequency higher than the first frequency.

2. The image capturing device according to claim 1, further comprising:
   a first detection device that detects a shake amount of the imaging lens; and
   a second detection device that detects a shake amount of the image capturing device body,
   wherein the processor is further configured to control by using at least one of the shake amount detected by the first detection device or the shake amount detected by the second detection device, as the shake amount of the image shake in a case where a shake amount detection performance by the first detection device and a shake amount detection performance by the second detection device are different from each other.

3. The image capturing device according to claim 2, wherein the processor is further configured to
   control the first correction device to correct the first frequency portion in a case where the shake amount detection performance by the first detection device is higher than the shake amount detection performance by the second detection device; and
   control the second correction device to correct the first frequency portion in a case where the shake amount detection performance by the second detection device is higher than the shake amount detection performance by the first detection device.

4. The image capturing device according to claim 2, wherein
   the first detection device and the second detection device include a filter, and
   the first frequency is a cutoff frequency of the filter included in any one of the first detection device and the second detection device that has the lower shake amount detection performance.

5. The image capturing device according to claim 3, wherein
   the first detection device and the second detection device include a filter, and
   the first frequency is a cutoff frequency of the filter included in any one of the first detection device and the second detection device that has the lower shake amount detection performance.

6. The image capturing device according to claim 1, wherein the processor includes a first processor that is provided in the imaging lens and controls the first correction device and a second processor that is provided in the image capturing device body and controls the second correction device.

7. The image capturing device according to any one of claim 1,
   wherein the processor is further configured to control the first correction device and the second correction device to correct the second frequency portion according to a ratio between a maximum value of a correction amount by the first correction device and a maximum value of a correction amount by the second correction device.

8. The image capturing device according to claim 2,
   wherein the processor is further configured to control the first correction device and the second correction device to correct the second frequency portion according to a ratio between a maximum value of a correction amount by the first correction device and a maximum value of a correction amount by the second correction device.

9. The image capturing device according to claim 3,
   wherein the processor is further configured to control the first correction device and the second correction device to correct the second frequency portion according to a ratio between a maximum value of a correction amount by the first correction device and a maximum value of a correction amount by the second correction device.

10. The image capturing device according to claim 4,
    wherein the processor is further configured to control the first correction device and the second correction device to correct the second frequency portion according to a ratio between a maximum value of a correction amount by the first correction device and a maximum value of a correction amount by the second correction device.

11. The image capturing device according to claim 5,
    wherein the processor is further configured to control the first correction device and the second correction device to correct the second frequency portion according to a ratio between a maximum value of a correction amount by the first correction device and a maximum value of a correction amount by the second correction device.

12. The image capturing device according to claim 6,
    wherein the processor is further configured to control the first correction device and the second correction device to correct the second frequency portion according to a ratio between a maximum value of a correction amount by the first correction device and a maximum value of a correction amount by the second correction device.

13. The image capturing device according to claim 1,
    wherein a frequency band of the correction of the image shake of the second detection device is different from a frequency band of the correction of the image shake of the first detection device.

14. The image capturing device according to claim 2,
    wherein a frequency band of the correction of the image shake of the second detection device is different from a frequency band of the correction of the image shake of the first detection device.

15. The image capturing device according to claim 3,
    wherein a frequency band of the correction of the image shake of the second detection device is different from a frequency band of the correction of the image shake of the first detection device.

16. The image capturing device according to claim 4,
    wherein a frequency band of the correction of the image shake of the second detection device is different from a frequency band of the correction of the image shake of the first detection device.

17. The image capturing device according to claim 5,
    wherein a frequency band of the correction of the image shake of the second detection device is different from a frequency band of the correction of the image shake of the first detection device.

18. The image capturing device according to claim 1, wherein the processor is further configured to control any one of the first detection device and the second detection device that has the lower that has the smaller lower limit of the frequency band of the correction of the image shake to correct the first frequency portion.

19. An image capturing method performed by an image capturing device including an imaging lens, an image capturing device body including an imaging element that captures an optical image transmitting through the imaging lens, a first correction unit that performs correction of an image shake by a correction lens, and a second correction unit that performs correction of the image shake by the image capturing device body, the method comprising:

controlling the first correction unit or the second correction unit to correct a first frequency portion of a shake amount of the image shake and controlling both the first correction unit and the second correction unit to correct a second frequency portion of the shake amount of the image shake having a frequency higher than the first frequency.

20. A non-transitory computer readable medium for storing a program for causing a computer controlling an image capturing device to execute a process, the image capturing device including an imaging lens, an image capturing device body including an imaging element that captures an optical image transmitting through the imaging lens, a first correction unit that performs correction of an image shake by a correction lens, and a second correction unit that performs correction of the image shake by the image capturing device body, the process comprising:

controlling the first correction unit or the second correction unit to correct a first frequency portion of a shake amount of the image shake and controlling both the first correction unit and the second correction unit to correct a second frequency portion of the shake amount of the image shake having a frequency higher than the first frequency.

* * * * *